United States Patent [19]

Christensen et al.

[11] 4,305,210

[45] Dec. 15, 1981

[54] APPARATUS FOR PROCESSING A POWDERED OR PARTICULATE PRODUCT

[75] Inventors: Mogens A. Christensen, Virum; Ib H. Sorensen, Frederikssund, both of Denmark

[73] Assignee: A/S Niro Atomizer, Soborg, Denmark

[21] Appl. No.: 123,042

[22] Filed: Feb. 20, 1980

Related U.S. Application Data

[63] Continuation-in-part of Ser. No. 855,081, Nov. 28, 1977, abandoned.

[30] Foreign Application Priority Data

Dec. 1, 1976 [DK] Denmark .............................. 5402/76

[51] Int. Cl.³ ............................................. F26B 17/10
[52] U.S. Cl. .................................. 34/57 A; 34/57 B; 34/164; 34/182; 406/75; 406/88
[58] Field of Search .............. 34/10, 156, 57 A, 57 R, 34/57 B, 181, 182, 164; 406/75, 88, 89; 432/58; 428/596; 72/379; 198/752, 771; 366/101; 49/483, 452

[56] References Cited

U.S. PATENT DOCUMENTS

| 1,974,665 | 9/1934 | Schnetzer et al. | 428/596 |
| 2,891,303 | 6/1959 | Stevenson | 428/596 |
| 3,166,383 | 1/1965 | Morris | 34/164 |
| 3,401,465 | 9/1968 | Larwill | 34/57 D |
| 3,543,414 | 12/1970 | Gomarin | 34/164 |
| 3,768,174 | 10/1973 | Biaggi | . |
| 4,033,555 | 7/1977 | Fong | 366/101 |

FOREIGN PATENT DOCUMENTS

| 2339964 | 2/1975 | Fed. Rep. of Germany | 34/156 |
| 963641 | 7/1964 | United Kingdom | 406/75 |

*Primary Examiner*—L. I. Schwartz
*Attorney, Agent, or Firm*—Dennison, Meserole, Pollack & Scheiner

[57] ABSTRACT

The invention relates to an apparatus for processing a powdered or particulate product forming a vibrating fluidized bed supported by a thin, perforated bed plate which is vibrated while gas is blown upwardly through the perforations of the plate.

The bed plate which is made from thin sheet metal is provided with parallel corrugations extending transversely to the direction in which the fluidized product is moved along the plate. The corrugations impart a desired stiffness to the plate and in order to promote removal of residual product from the plate when supply of product to the plate has been terminated, the openings in the plate may be formed so as to direct gas flows supplied therethrough in the same general direction transverse to said corrugations towards an outlet of the apparatus.

12 Claims, 18 Drawing Figures

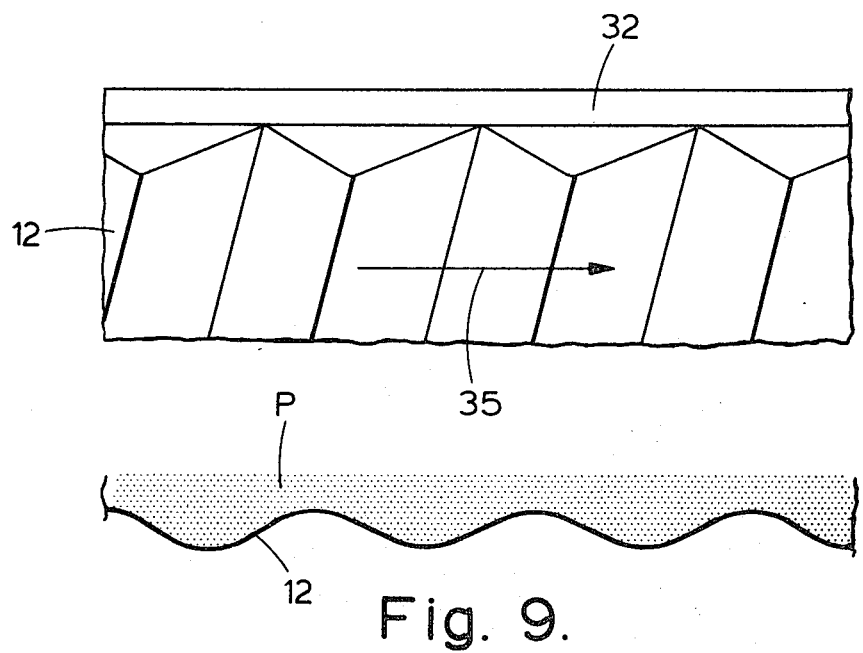
Fig. 9.
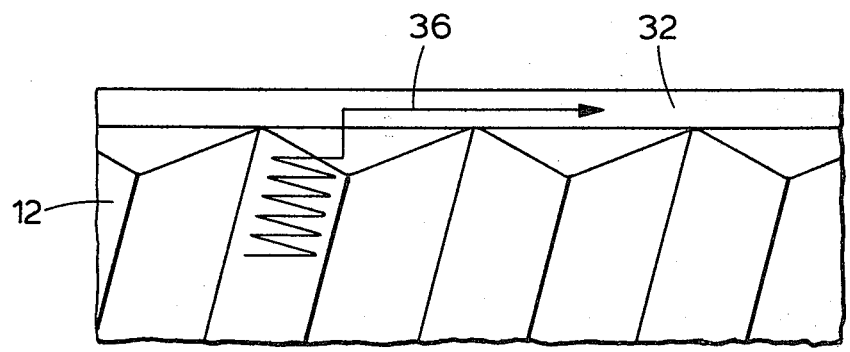
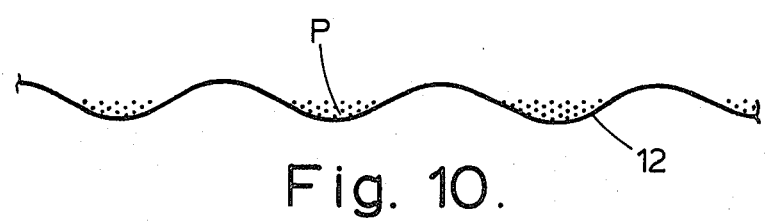
Fig. 10.

APPARATUS FOR PROCESSING A POWDERED OR PARTICULATE PRODUCT

This is a continuation-in-part of application Ser. No. 855,081 filed Nov. 28, 1977, now abandoned.

BACKGROUND OF THE INVENTION

1. Field of the Invention

The present invention relates to an apparatus for processing a powdered or particulate product being fed onto a substantially horizontally arranged thin, perforated plate which is vibrated while blowing gas upwardly through the perforations or openings thereof. In this manner the powdered or particulate product may be maintained in a fluidized condition while being moved along the plate in a so-called vibrated fluid bed. Thereby it is possible to obtain a good contact between the particles of the product and the processing gas which flows up through the perforations of the bed plate, and which may, for example, be heated air. Such fluidizing apparatus is generally used in connection with drying and/or agglomeration of powdered products, for example for additional drying of spray dried products. It should be understood, however, that in principle the apparatus to be described may also be used in connection with any other processing of a powdered or particulate product with gas flowing upwardly through the perforations.

2. Description of the Prior Art

In order to reduce the amount of the product falling down through the perforations of the vibrating bed plate when moved along that plate in a fluidized condition, these perforations or openings—which are normally formed by punching—must be relatively small. However, a normal condition for forming holes or perforations in a plate by punching is that the diameter of the holes should not be smaller than the thickness of the plate. Consequently, in order to produce a plate having small (for example of the order of 1 mm) holes or perforations punched therein it is necessary to use a relatively thin plate (for example with a thickness of less than 1 mm).

Such a thin plate does not possess a sufficient inherent rigidity, and therefore it is necessary to provide some kind of stiffening. In a known embodiment the bed plate is stretched over a frame-like part and fastened thereto along the edge portions of the plate by welding. Such welding may cause creation of flaws in the plate due to stress concentrations. It is also known to support the plate by ribs positioned at the bottom surface thereof. Such ribs give raise to the formation of undesired "dead zones" on the plate because the ribs cover and close the holes or perforations in the plate at the positions where they engage with the bottom surface of the plate. When a perforated bed plate of the type described is used for processing perishable products within food industry, for example for drying powdered milk products, the plate must be formed so as to be easy to clean and so as to avoid sharp and not easily accessible corners, narrow pockets, and the like which may collect deposits of the product being treated and thereby create favourable conditions for bacterial growth. These requirements may hardly be fulfilled by using a bed plate supported by ribs as described above, and therefore, in practice a plate of that type is not suited for use in sanitary plants.

Furthermore, when a thin plate supported or stiffened at substantially spaced locations in a known manner is vibrated, the plate will also tend to vibrate with its own fundamental frequencies which are difficult to predict and which may cause that the residence time of the product will be different at various parts of the plate in an unpredictable manner.

Apparatuses of the type described above are known, for example from U.S. Pat. Nos. 3,768,174, 3,821,342, and 4,033,555.

SUMMARY OF THE INVENTION

The present invention provides an apparatus of the above type which is especially suited for sanitary use, i.e. for treating food products. Thus, the invention provides an apparatus for processing a powdered or particulate product, said apparatus comprising: a substantially horizontally arranged thin corrugated bed plate having substantially parallel corrugations comprising juxtaposed ridges and valleys, and a multiplicity of closely spaced punched small openings distributed substantially uniformly along the surfaces of the ridges and valleys of said plate; product feeding means for feeding a powdered or particulate product on to said plate; vibrating means for vibrating said plate; gas supply means for supplying a flow of gas upwardly through each of said openings in said plate so as to fluidize said product on said plate; and product discharge means for discharging processed product from the apparatus at such a position that said fluidized product is moved along the upper surface of said plate in a direction transverse to said corrugations.

It is well known that corrugations in a plate cause a substantial increase of the plate stiffness transverse to the longitudinal direction of the corrugation. However, up till now thin corrugated plates have apparently not been used in connection with apparatuses of the above type. Probably, the reason is that it was believed that transversely extending corrugations wound counteract the desired movement of the fluidized product along the plate to an unacceptable extent.

U.S. Pat. No. 3,401,465 discloses a fluidizing apparatus having a bed plate which is made from a relatively thick plate material, and which has corrugations with a serrated cross-section. This known bed plate is provided with relatively big openings, but only at the substantially vertical parts of the corrugations. Thus, these openings are directed substantially parallel with the general plane of the bed plate and therefore assist in transporting the product along the bed plate in the desired direction transversely to the corrugations thereof. This known corrugated bed plate having relatively few and big openings therein would not be suitable for processing sticky products.

It has surprisingly been found, however, that the transverse parallel corrugations do not substantially restrain movement of the fluidized product in a direction transverse to the corrugations, provided that product is supplied in such an amount that a suitable thickness of the layer of fluidized product is obtained on the bed plate. However, the corrugations impart a sufficient stiffness to the plate without blocking any of the perforations and without rendering clearing of the plate substantially more difficult. Furthermore, no undesired free oscillations influencing the residence time of the product on the plate tend to arise in the stiff corrugated plate.

When the product to be processed is of a sticky nature, such as humid milk products, it is important that the fluidizing gas is supplied into the product as a great number of fine, closely spaced gas flows in order to obtain a satisfactory fluidization of the product supplied to the vibrated, corrugated plate. This may be obtained in the apparatus according to the invention where the openings distributed substantially uniformly along the surfaces of ridges and valleys of the corrugated plate may be closely spaced and may be made with small dimensions because of the small thickness of the plate.

The corrugations of the plate may extend in any transverse direction and may, for example, extend at right angles to the direction of movement of the product which is normally the longitudinal direction of the plate. It has been found, however, that a plate having such corrugations extending at right angles to the direction of movement is self-clearing or self-emptying to a smaller degree than a plane bed plate, which means that a small amount of the product will remain in the corrugation valleys even when the vibrating movement of the plate continues for a period of time after termination of feeding product to the plate. However, when the plate is vibrated so as to move the product in a direction forming an acute angle with the parallel corrugations the plate will be self-emptying to a substantially higher degree. The reason is that the amount of product remaining in the corrugation valleys after termination of the feeding of product to the plate will move along the obliquely extending corrugation valleys under the influence of the continued vibrating movement of the plate and accumulate at the ends of the corrugations along the plate edge portion. The oblique direction of the corrugations does not influence the direction of movement of the product under normal operation, namely when such an amount of product is fed to the plate that a layer of suitable thickness is formed thereon.

In case the acute angle formed between the corrugations and the direction of movement of the product is relatively big and approximates 90° the self-clearing or self-emptying effect described above is obtained to a small extent only, and if, on the contrary, the angle is very small the stiffening effect of the corrugations is substantially reduced. Therefore, the said acute angle may advantageously be 45°–75°, preferably 60°–65°. By choosing the direction of the corrugations within these limits a sufficient rate of self-clearing or self-emptying may be obtained without reducing the stiffness of the plate of an unsatisfactory degree.

The self-clearing rate may be further increased when the corrugations of the plate form a herringbone pattern. During the clearing or emptying operation the product will—depending on the orientation of the herringbone pattern in relation to the normal direction of movement of the product over the bed plate—either move outwardly toward the longitudinal edges of the bed plate, or inwardly toward the center line of the bed plate. In order to facilitate removal of the product having been moved to the edge portions of the plate during the emptying operation the plate may advantageously define one or more channels or grooves extending transversely to said corrugations and preferably along at least one edge portion of said plate, the depths of the channel or groove being preferably at least the same as that of the adjoining corrugation valleys. If the corrugations define a herringbone pattern orientated so that the product tend to move toward the center line of the plate during the emptying operation the plate may have a longitudinally extending channel or groove along the center line. Such central channel or groove will normally reduce the stiffness of the plate seriously, and therefore it is preferred to orientate the corrugations so that during the emptying operation the product is collected along one or both of the longitudinal edges of the plate, and the said channels or grooves may then be formed along these edge portions. Such a bed plate provided with channels or grooves will normally be completely self-clearing or self-emptying. If desired, the emptying operation may, however, be promoted by using air-nozzles or other means, such as mechanical means, for removing the product collected in the channels during the emptying operation.

In the presently preferred embodiment of the apparatus according to the invention at least the major part of the openings in the bed plate are formed so as to impart to the gas flow supplied therethrough a horizontal flow component directed towards said product discharge means. The apparatus may then be made self-clearing or self-emptying even when the angle defined between the direction of the corrugations and the direction of movement of the product along the plate is 90°.

It has been found that if a plane, non-corrugated bed plate is made with so-called lipped openings providing substantially mutually parallel gas flows which are parallel with or define a small acune angle with the plane of the plate, the movement of the fluidized product along the plate towards the outlet of the fluidizing apparatus is promoted to such an extent that a disadvantageous backmixing of the product takes place. This tendency of backmixing is reduced or eliminated when, in accordance with the invention, the plate is corrugated. Each of said substantial number of openings may be formed by an incision through said plate, the plate portion adjacent to and on the side of the incision being opposite to said discharge means being depressed so as to define the opening. In a plate of a given small thickness such openings may be made substantially smaller than normal punched openings which means that the bed plate may be provided with an increased number of more closely spaced openings without requiring supply of an increased amount of fluidizing gas. The increased number of openings means a better fluidization of sticky products.

The invention also relates to an elongated plate for supporting a vibrated fluidized bed, said plate being made from thin sheet metal having substantially parallel corrugations comprising juxtaposed ridges and valleys, and a multiplicity of small, closely spaced, punched openings substantially uniformly distributed along the surfaces of the ridges and valleys of said plate, each of at least the major part of said openings being formed by an incision through said sheet metal, the sheet portion adjacent to and on one side of the incision being depressed, all of said incisions being substantially mutually parallel and non-perpendicular to the extension of said corrugations, and all said depressed sheet portions being located on the same side of the respective incisions.

Furthermore, the invention provides a method of making the above bed plate said method comprising punching a multiplicity of small, closely spaced lipped openings in a thin sheet metal, and subsequently corrugating said punched sheet metal so as to form substantially parallel corrugations therein.

BRIEF DESCRIPTION OF THE DRAWINGS

The invention will now be further described with reference to the drawings, in which FIG. 1a is the outlet end of a modified embodiment of the apparatus according to the invention provided with an adjustable damper, FIGS. 9 and 10 illustrate the movement of the powdered or particulate product over the bed plate under normal operation of the apparatus and under the emptying operation, respectively.

DESCRIPTION OF THE PREFERRED EMBODIMENTS

Figure 1:
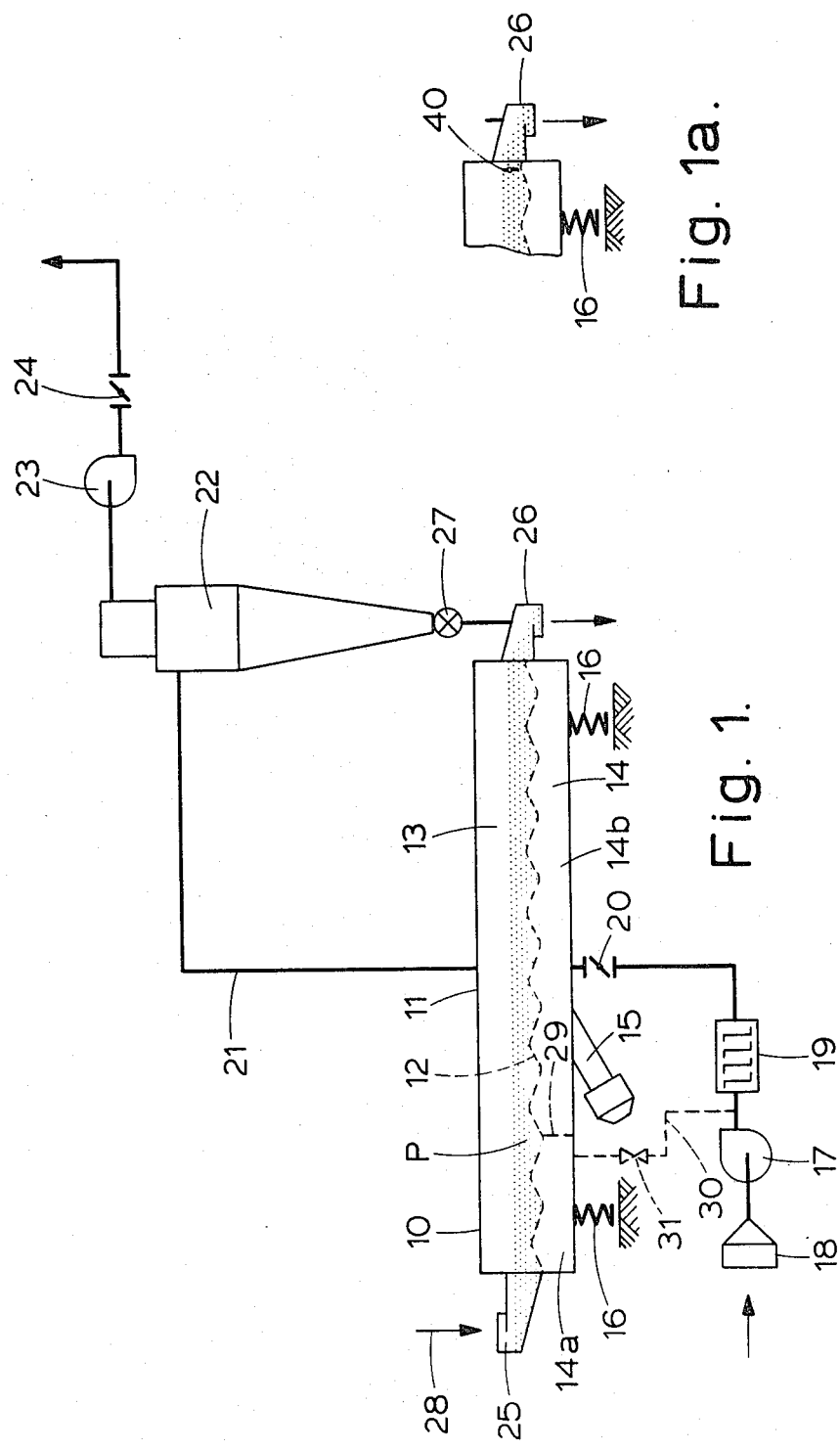
FIG. 1 is a diagrammatic illustration of a drying system including an embodiment of the apparatus according to the invention.

The drying system shown in FIG. 1 is adapted to dry a powdered or particulate material or product which may, for example, have been made by a spray drying process, and which is still moist or humid.

The system shown in FIG. 1 includes a drying apparatus 10 of the type having a vibrated fluidized bed. The drying apparatus 10 includes a substantially cylindrical housing or container 11 having a substantially horizontally extending axis. The inner space of the housing 11 is separated into an upper and a lower space 13 and 14, respectively, by means of a perforated bed plate 12 fastened to the inner walls of the housing. The housing 11 is supported by elastic supporting means or springs 16. The housing 11 and the perforated bed plate arranged therein may be vibrated by means of a vibrator 15 mounted on the housing. A blower 17 may suck air through a filter 18 and blow the air through a suitable heating device 19 and an adjustable damper 20 into the lower space 14 of the container or housing 11. An outlet conduit 21 for drying air connects the upper space 13 of the housing 11 to a cyclone 22 from which the drying air is blown into the atmosphere by means of a blower 23 and via an adjustable damper 24. At one end the container or housing 11 is provided with a product inlet 25 opening into the upper space 13 defined above the perforated bed plate 12, and at the other end the container housing 11 is provided with a product outlet 26 which is also communicating with the upper space 13 and with the product outlet conduit of the cyclone 22 containing a powder lock 27.

A moist powdered or particulate product P which may for example come from a conventional spray drying system and which is to be further dried in the apparatus 10 is continuously fed into the product inlet 25 of the container 11 as indicated by an arrow 28. Drying air heated by means of the heating device 19 is simultaneously blow into the lower space 14 of the housing 11 by means of the blower 17. From the lower space 14 the drying air flows up through the perforations of the bed plate 12, and the housing 11 and the bed plate 12 are vibrated by the vibrator 15 in known manner. The moist product fed into the apparatus 10 will then form a vibrated fluidized bed above the perforated plate 12, and while moving from the inlet 25 to the outlet 26 with a controlled speed the product P comes into intimate contact with the hot drying air whereby it is dried. The blower 23 discharges the used drying air through the conduit 21 and into the cyclone 22, where possible entrained dried product is separated before the drying air is discharged into the atmosphere. The product separated from the drying air may be united with the finished dried product leaving the apparatus 10 through the outlet 26.

Conventional drying apparatuses with vibrated fluid beds have a perforated bed plate 12 which is plane. Contrary to that the bed plate 12 of the apparatus according to the invention has a corrugated form. If the apparatus should be used for treating sticky or thermoplastic products the lower space 14 of the container or housing 11 may be separated into a cold zone 14a adjacent to the product inlet 25 and a zone 14b adjacent to the product outlet 26 by means of a partition wall 29. The blower 17 may then commnicate directly with the cold zone 14a by means of a conduit 30 including a control valve 31. In FIG. 1 the partition wall 29, the conduit 30, and the valve 31 are shown in broken lines.

By means of the modified system just described it is possible to treat thermoplastic products such as milk powder supplied to the product inlet 25 in a moist and hot condition. In the area above the cold zone 14a the thermoplastic product is cooled whereby its plastic sticky condition is changed. Consequently, the product may become fluidized before reaching the area above the hot zone 14b.

The said problems in fluidizing thermoplastic products may, however, be solved still more simple by maintaining a relatively thick layer of these products above the bed plate 12 during the drying process. Thus, instead of or in addition to the desired separation in zones 14a and 14b, the product outlet 26 of the drying apparatus 10 may be provided with an adjustable damper 40 as shown in FIG. 1a.

Figure 2:
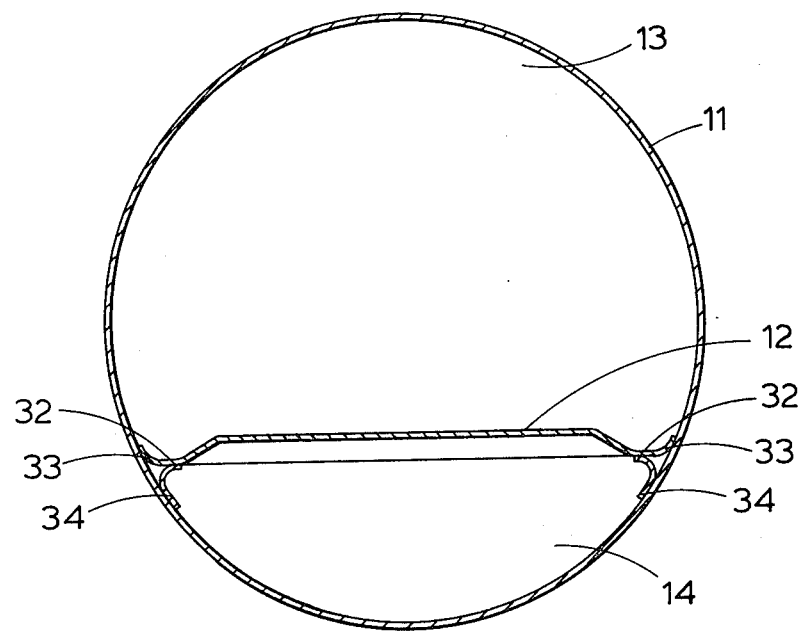
FIG. 2 is a cross-sectional view of the drying apparatus according to FIG. 1 shown in an enlarged scale.

The upper surface of the bed plate 12, which is provided with transversely extending corrugations, may define channels or grooves 32 extending along the longitudinal edge portions of the plate and having a purpose to be described later. When the drying apparatus is to be used for treating perishable food products it is important that no flaws, sharp corners, pockets, or the like are formed in the inner space of the container or housing 11, because such pockets are difficult to clean and may collect residues of the treated products and thereby provide favourable conditions for bacterial growth. Therefore, the bed plate 12 is formed with an upwardly extending edge portion 33 which is tightly fastened to the inner wall of the housing 11 in its full length, preferably by welding or gluening. In order to avoid sharp corners also in the lower space 14 of the housing 11, covering strips 34 having a suitable curved cross section (FIG. 2) are welded to the bottom side of the bed plate 12 and also to the inner wall of the housing.

Figure 4:
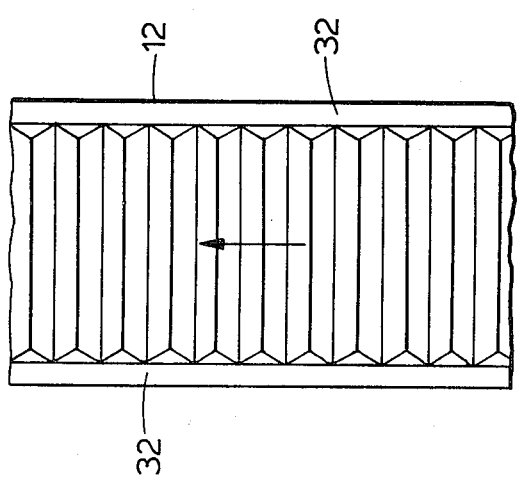
FIGS. 4–6 are plan views showing parts of three different embodiments of the perforated product supporting bed plate.
Figure 5:
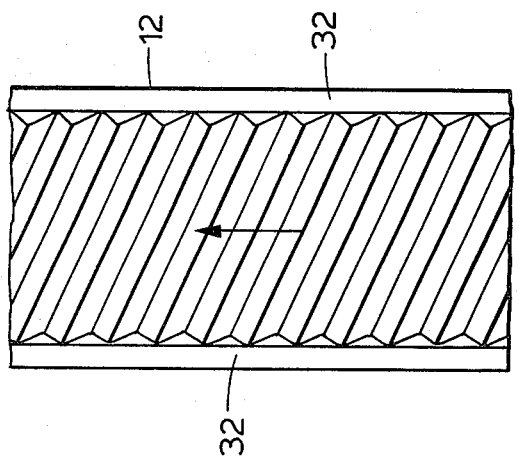
Figure 6:
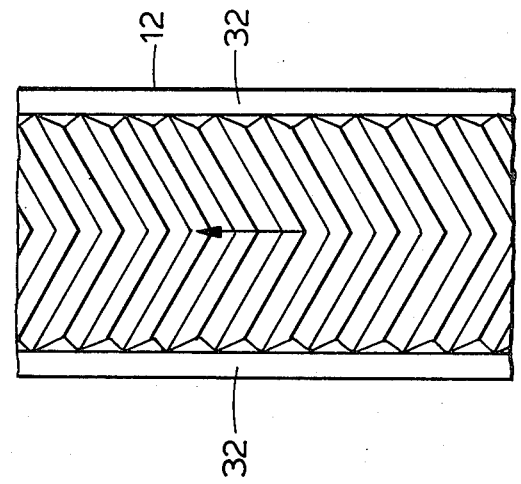

As shown in FIG. 4, the corrugations of the bed plate 12 may extend at right angles to the longitudinal direction of the plate. When such a plate is used, part of the product to be dried will remain in the corrugation valleys even if operation of the apparatus is continued for a period of time after stopping the supply of product. Thus, when the apparatus 10 is provided with a bed plate of the type shown in FIG. 4 the apparatus is not self-emptying, but emptying must take place in another manner, for example by moving the product from the corrugation valleys into one of the channels or grooves 32 by tilting the container 11. Thereafter, the product may be removed by mechanical means or be blown out by means of an air jet. If, however, the bed plate 12 is formed with obliquely extending corrugations either as shown in FIG. 5, or as shown in FIG. 6 where the corrugations form a herringbone pattern, the apparatus will be self-emptying or self-clearing when the product is moved in the direction indicated by arrows as described below.

Figure 7:
FIGS. 7 and 8 are sectional views showing two different wave shapes of the corrugated product supporting bed plate in an enlarged scale.
Figure 8:

The corrugated bed plate 12 is normally made from sheet metal, and the outline of the plate is preferably substantially rectangular or of another elongated form. The bed plate 12 may have any suitable wave profile, such as a sinusoidal shape as shown in FIG. 7, or a more sharp-edged shape as shown in FIG. 8. The vibrating movement imparted to the container 11 and to the corrugated bed plate 12 therein by the vibrator 15 is normally of a character so as to tend to impart obliquely upwardly and forwardly directed throwing movements to the product, and the profile of the bed plate 12 is preferably adapted to the vibrating movement so that the angle formed between the throwing direction and a horizontal plane is not smaller than the maximum angle of inclination $\alpha$ of the wave profile, vide FIGS. 7 and 8.

In normal operation of the apparatus the product is exposed to the vibrating movement described above and to the drying air flowing upwardly through the perforated bed plate 12, and it will move along the plate in a fluidized condition as illustrated in FIG. 9. Despite the oblique direction of the corrugations the product P will move substantially in the longitudinal direction of the plate as indicated by an arrow 35. The most humid or moist and, consequently, the heavier part of the product P will tend to be positioned at the bottom of the fluidized bed and therefore obtain an increased residence time in the apparatus and become exposed to the heaviest drying treatment.

Figure 3:
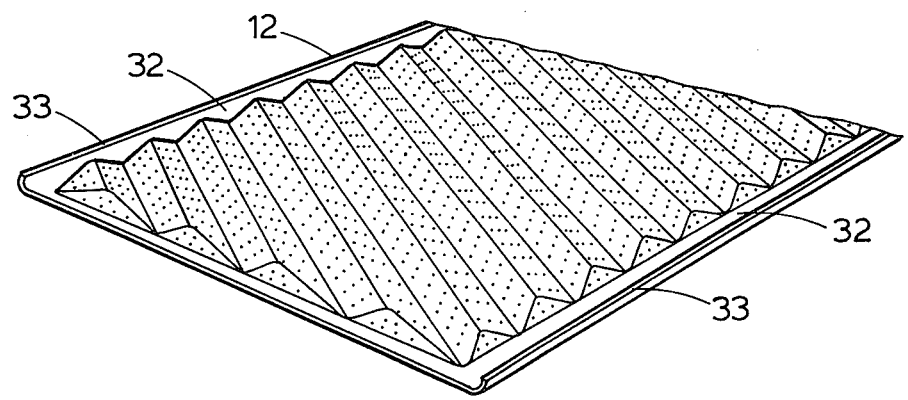
FIG. 3 is a perspective view showing one end portion of a perforated product supporting bed plate used in the apparatus according to the invention.

When the supply of product to the apparatus through the product inlet 25 stops, part of the product will tend to remain in the corrugation valleys of the bed plate 12 as previously described (FIG. 10), but due to the oblique direction of the corrugations this remaining amount of the product is quickly moved out into one of the longitudinal channels 32 of the plate as indicated by a zigzag-shaped arrow 36 in FIG. 10. The product may be removed from the channel 32 by the vibrations, possibly supplemented by tilting of the container 11 or by using an air jet. If the bed plate 12 is of the type shown in FIGS. 3 and 5 the remaining amount of product is moved out in only one of the channels 32, whereas a plate of the type shown in FIG. 6 will make a contribution to a more quick emptying or cleaning because the product will be moved out into both of the channels 32 formed along opposite longitudinal edge portions of the plate.

A preferred embodiment of the apparatus according to the invention will now be described with reference to FIGS. 11–13 of the drawings wherein parts corresponding to parts of the apparatus illustrated in FIG. 1 have been designated by similar reference numerals.

Figure 11:
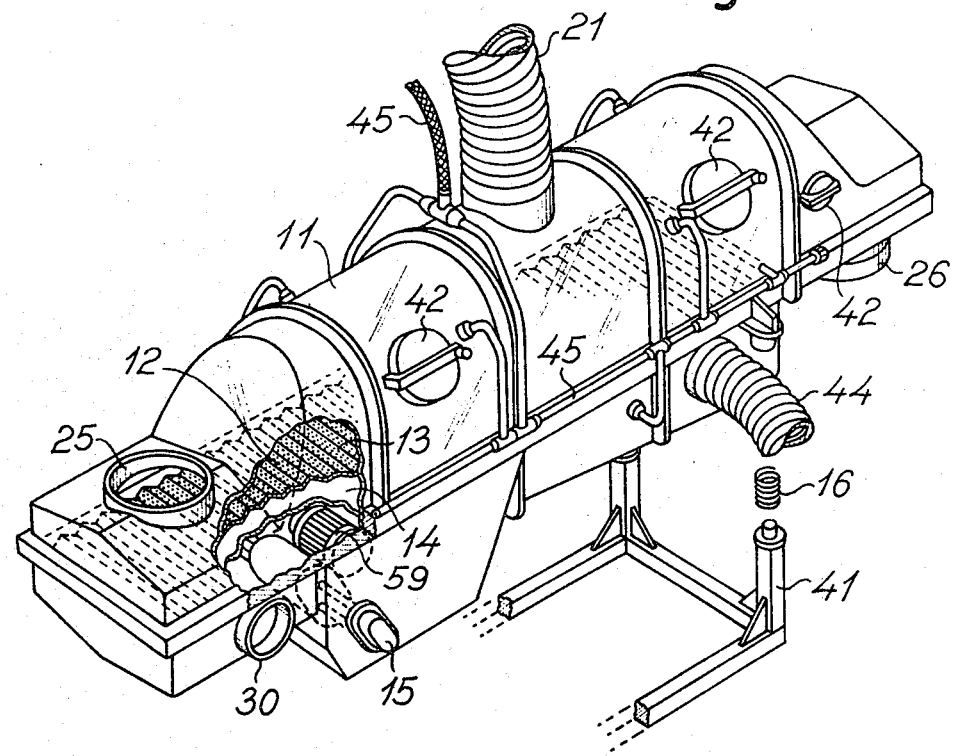
FIG. 11 is a perspective and partly exploded view of a preferred embodiment of the apparatus according to the invention, certain parts having been cut away.
Figure 12:
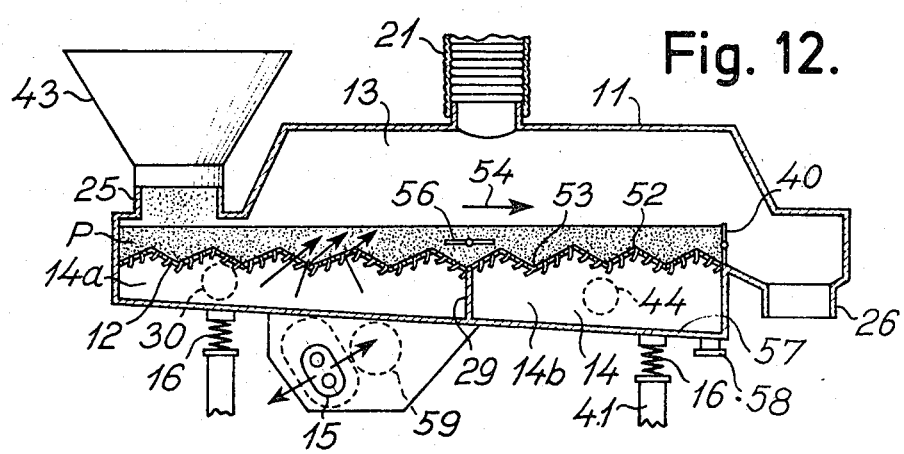
FIG. 12 is a diagrammatic sectional view of the apparatus shown in FIG. 11.
Figure 13:
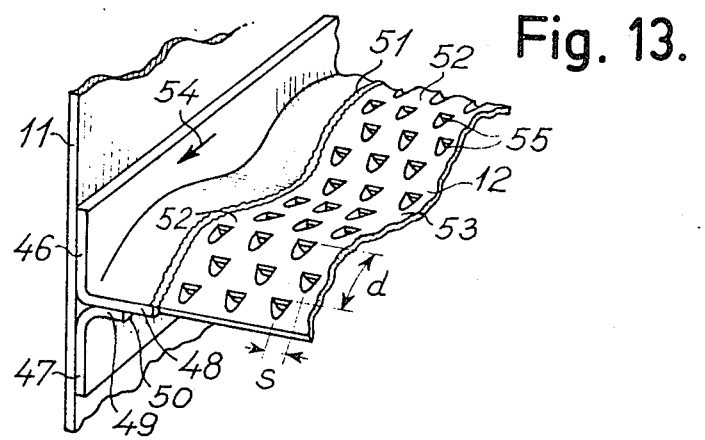
FIG. 13 is a perspective fractional view in an enlarged scale and illustrating the fastening of the bed plate.

The apparatus shown in FIGS. 11–13 comprises a supporting frame structure 41 on which the container or housing 11 is mounted by means of the elastic supporting means or springs 16. The housing 11, which is provided with inspection covers 42, has a reduced height at its ends where the product inlet 25 and the product outlet 26, respectively, are located. The product inlet 25 which may be connected to an inlet hopper 43 as shown in FIG. 12, is preferably positioned so that the product to be dried in the apparatus will drop substantially vertically on to the perforated bed plate 12. This is especially important when the product to be dried is of a sticky nature, because the product will then drop down on to a fluidized layer of partly dried product and not come into direct contact with the bed plate. The lower space or plenum chamber 14 defined below the bed plate 12 may be divided into two separate chambers 14a and 14b, respectively, by a partition wall 29 as previously described, and fluidizing pressurized gas may then be supplied to the plenum chambers 14a and 14b through gas inlets 30 and 44, respectively. In order to avoid the formation of vertical gas whirl motions within the plenum chambers, which might adversely influence the gas flows through the perforations of the bed plate 12, the fluidizing gas is preferably supplied to the plenum chamber through the gas inlet 30 and 44 in substantially horizontal directions. The fluidizing gas or air supplied through the inlets 30 and 44 may be of different kinds and/or temperatures. However, the partition wall 29 may be dispensed with, if desired, and the fluidizing gas or air may be supplied to the plenum chamber 14 through a single gas inlet or conduit.

As shown in FIG. 11 the housing 11 may be provided with a cleaning or flushing system comprising a system of water conduits 45 for supplying water under pressure to spraying devices (not shown) arranged within the housing 11.

The longitudinal edges of the corrugated bed plate 12 are fastened to the adjacent side walls of the house 11 by means of angle members 46 and 47. These angle members have horizontally extending corrugated flanges 48 and 49, respectively, which are fastened to each other, preferably by a welded seam 50. Each longitudinal edge of the bed plate 12 is fastened to the adjacent free edge of the horizontal corrugated flange 48 of the angle member 46 by a welded seam 51. The width of the horizontal flange 49 is preferably smaller than that of the flange 48 in order to obtain a transverse spacing between the welded seams 50 and 51, as shown in FIG. 13. By this fastening structure sharp corners and deep pockets, which are difficult to clean, are avoided.

The bed plate 12 is provided with an array of closely spaced so-called lipped openings 55 which may, for example be of the type shown in U.S. Pat. Nos. 3,821,342 and 4,033,555. Each such openings may be formed by an incision through the plate and by making a depression adjacent to and on one side of the incision.

The corrugated bed plate 12 comprises a number of juxtaposed ridges 52 and valleys 53 (FIG. 13), and the openings 55 are preferably so closely spaced that a multiplicity of openings are uniformly distributed along the surface of each ridge and valley. That means that the gas flows passing through the openings 55 from the plenum chamber 14 will define varying angles with a horizontal plane, but each such gas flow will have a greater or smaller flow component in the longitudinal direction indicated by an arrow 54 in FIGS. 12 and 13.

When the apparatus shown in FIGS. 11–13 is operating the product P to be dried is supplied to one end portion of the bed plate 12 through the hopper 43 and the inlet 25. Fluidizing air or gas supplied to the plenum chambers 14a and 14b through the conduits 30 and 44 is flowing upwardly through the openings 55 in the bed plate 12 as fine air jets or gas flows while the total housing 11 is being vibrated by means of the vibrator 15 driven by a motor 59. Exhaust gas or air leaves the apparatus through the outlet conduit 21, and dried product is discharged through the product outlet 26.

The apparatus may be divided into heating and cooling sections. In that case heated air or gas may be supplied to the plenum chamber 14a through the gas inlet 30 while cooling gas or air is supplied to the plenum chamber 14b through the conduit 44. The apparatus may then be provided with an additional adjustable damper 56 positioned above the partition wall 29. This additional damper may be placed in its vertical position when the apparatus is started in order to prevent that the humid product initially supplied to the bed plate 12 is moved to the cooling section of the apparatus above the plenum chamber 14b before it has been sufficiently dried. When a sufficient portion of product in the heating section of the apparatus above the plenum chamber 14a has been dried, the damper 56 may gradually be moved to its open position shown in FIG. 12. The thickness of the fluidized product layer above the bed plate 12 is thereafter substantially determined by the position of the adjustable damper 40.

When operation of the apparatus is to be stopped feeding of product P into the hopper 43 is terminated and the damper 40 is gradually being opened while supply of fluidizing gas and vibration of the housing is being continued. The dried product will then be removed from the upper space 13 of the housing 11 and due to the fact that the gas or air flow through the openings 55 in the bed plate 12 have a horizontal component directed towards the outlet 26 any residual product will be blown out from the valleys 53 of the bed plate so that the apparatus is self-clearing. When substantially all of the dried product P has been discharged from the apparatus, water or another rinsing liquid under pressure may be supplied to the water conduit 45 and to the spraying devices arranged within the housing 11. Fluidizing air or gas is preferably supplied to the apparatus during the rinsing or flushing process, whereby the rinsing of the apparatus becomes more efficient and rinsing water is blown out from the valleys of the corrugated bed plate 12 when supply of rinsing water through the conduit 45 has been stopped. The bottom 57 of the plenum chamber 14 is preferably sloping so that rinsing water will collect at the lower end of the bottom, where it may be discharged through a liquid outlet 58.

Figure 15:
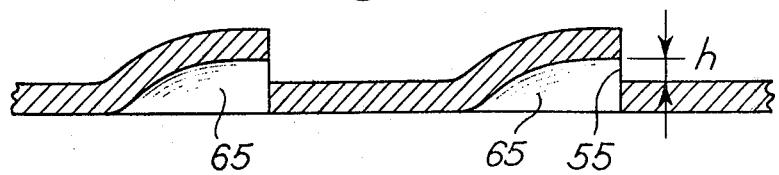
FIG. 15 is a section along the line 15—15 in FIG. 14 shown in an enlarged scale.
Figure 16:
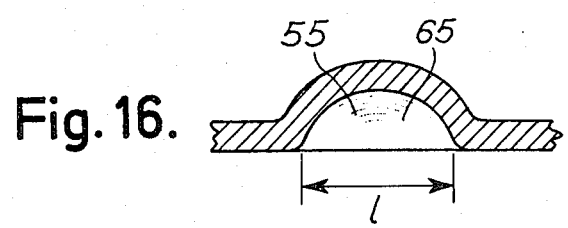
FIG. 16 is a section along the line 16—16 in FIG. 14 shown in an enlarged scale.

The bed plate 12 may be made from thin sheet metal in which an array of closely spaced lipped openings 55 are punched in a conventional manner by providing a multiplicity of substantially parallel incisions and a depression 65 at one side of each incision as best shown in FIGS. 15 and 16.

Figure 14:
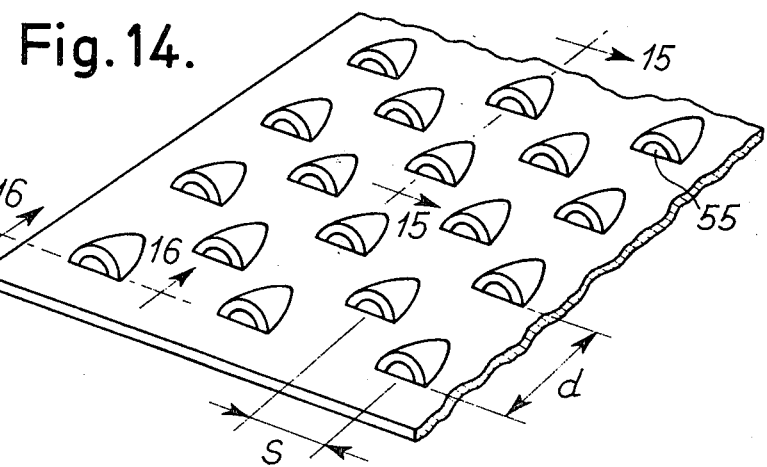
FIG. 14 is a perspective view of a fraction of thin sheet metal in which lipped openings have been punched.
Figure 17:
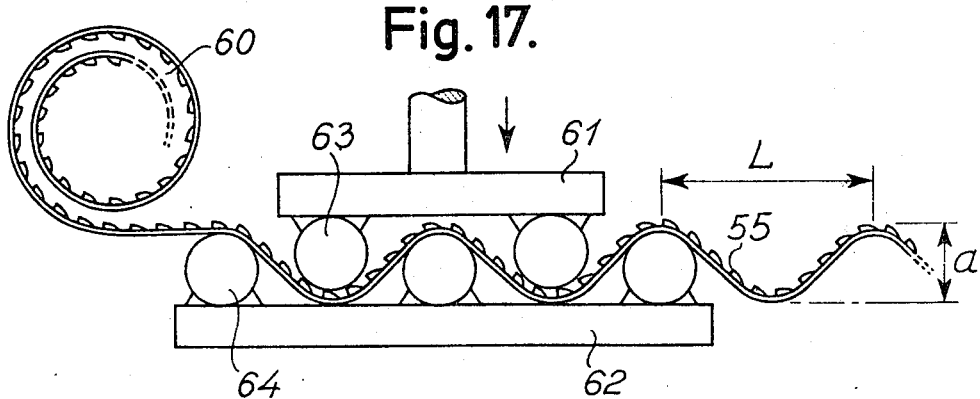
FIG. 17 illustrates how punched sheet metal of the type shown in FIG. 4 may be corrugated so as to form a bed plate.

FIG. 17 shows a coil 60 of punched sheet metal as that shown in FIGS. 14 to 16. This sheet metal provided with lipped openings 55 may be corrugated by means of a corrugating tool having an upper tool part 61 and a lower tool part 62, and these tool parts are provided with spaced cylindrical members 63 and 64, respectively. The punched sheet metal to be corrugated is preferably supplied to the corrugating tool 61, 62 so that the incisions in the sheet metal extend substantially parallel with the axis of the cylindrical tool members 63 and 64. The upper tool part 61 is movable between an upper position in which it is out of engagement with the sheet metal, and a lower position shown in FIG. 7, in which both tool parts are engaging with the sheet metal. When the upper tool part 61 is in its upper position the plane sheet metal to be corrugated may be placed between tool parts 61 and 62, and when the upper tool part is thereafter moved to its lower position as indicated by an arrow in FIG. 17 the cylindrical members 63 and 64 form corresponding juxtaposed ridges and valleys in the sheet metal as shown in FIG. 17. By intermittently moving sheet metal to the right in FIG. 17 a corrugated plate having the desired length may be formed. The pressure which must be applied to the punched metal by the cylindrical members during the corrugating process is not of such value that any of the lipped openings 55 will be deformed to any substantial extent. After corrugation of the sheet metal forming the bed plate 12 the upper surface of the bed plate (the surface in which the depression 65 is formed, which is the upper surface in FIGS. 13 and 15) is polished, for example by electro-polishing or glass blasting (blasting with small spherical glass particles). The upper surface of the bed plate 12 may advantageously be glass blasted after having been mounted within the housing 11.

EXAMPLE

In a practical embodiment the corrugated bed plate 12 is made from a plane sheet of stainless steel in which a plurality of equidistant linear rows of lipped openings 55 are punched, vide FIGS. 14 and 15. The spacing s between adjacent linear rows is approximately 4 mm, and the openings in adjacent rows are offset in relation to each other. The distance d between adjacent openings in each linear row is about 5 mm. Each lipped opening 55 is made by an incision having a length 1 of about 1.6 mm and extending transversely to said linear row, and by a depression 65 at one side of the incision having a maximum depth h at this incision at about 0.16–0.2 mm. The plane plate provided with lipped openings in the manner described in thereafter provided with corrugations having juxtaposed ridges 52 and valleys 53 extending substantially parallel with the incisions in the plate as illustrated in FIG. 17.

The wave length L (the distance between the tops of adjacent ridges or the bottoms of adjacent valleys) of the corrugation of the plate is approximately 140 mm and the amplitude a (the vertical distance between the tops of the ridges and the bottoms of the valleys) is about 28 mm.

When a bed plate of this type is used in an apparatus corresponding to that shown in FIGS. 11–13 for drying milk, which has been partly dried in a conventional spray-drying system, the housing 11 is vibrated at a frequency of 500–800 cycles per minute, depending on the fat content of the milk product. Normally, a small vacuum of about 2–5 mm column of water is maintained in the upper space 13 of the housing 11 while a pressure of about 120 mm column of water above atmospheric pressure is maintained in the plenum chamber 14 below the bed plate 12. However, these pressure values depend to some extent on the type of product being dried.

It should be understood that various amendments of the embodiments described above made be made without departing from the scope of the invention as defined in the appended claims. As an example, the corrugation of the bed plate 12 may be provided with obliquely extending corrugations or corrugations forming a herringbone pattern as shown in FIGS. 15 and 16 of applicant's above patent. Furthermore, the lipped openings 55 illustrated in FIG. 13 may be formed in any suitable manner provided that the gas flows through these openings are directed so that they obtain a flow component tending to move the product being dried towards the product outlet 26 of the apparatus.

We claim:

1. An apparatus for processing a powdered or particulate product, said apparatus comprising:
a substantially horizontally arranged thin, corrugated bed plate having substantially parallel corrugations comprising juxtaposed ridges and valleys and a multiplicity of closely spaced punched small openings, distributed substantially uniformly along the surfaces of the ridges and valleys of said plate;
product feeding means for feeding a powdered or particulate product onto said plate;
vibrating means for vibrating said plate;
gas supply means for supplying a flow of gas upwardly through each of said openings in said plate so as to fluidize said product on said plate; and
product discharge means for discharging processed product from the apparatus at such a position that said fluidized product is moved along the upper surface of said plate in a direction transverse to said corrugations.

2. An apparatus according to claim 1, wherein the corrugations of said plate extend in a direction forming an acute angle with said direction of movement of the fluidized product.

3. An apparatus according to claim 2, wherein said acute angle is 45°–75°, preferably 60°–65°.

4. An apparatus according to claim 3, wherein the corrugations of said plate form a herringbone pattern.

5. An apparatus according to claim 2, wherein said plate defines one or more channels or grooves extending transversely to said corrugations and preferably along at least one edge portion of said plate.

6. An apparatus according to claim 1, wherein said gas supply means are adapted to supply cold gas through the small openings of a plate portion adjacent to the position at which product is fed on to said plate by said product feeding means, and to supply hot gas through the openings of the remaining part of the plate.

7. An apparatus according to claim 1, wherein said product discharge means comprises an adjustable outlet obstructing means for controlling the thickness of the fluidized product layer formed on said plate.

8. An apparatus according to claim 1, wherein at least the major part of said openings are formed so as to impart to the gas flow supplied therethrough a horizontal flow component directed towards said product discharge means.

9. An apparatus according to claim 8, wherein each of said major part of openings is formed by an incision through said plate, the plate portion adjacent to and on the side of the incision being opposite to discharge means being depressed so as to define the opening.

10. An apparatus according to claim 8, wherein said gas supply means comprises a plenum chamber having a top wall comprising said plate, and a gas inlet communicating with said plenum chamber for supplying pressurized gas thereto in a substantially horizontal direction and transversely to said horizontal flow component.

11. An apparatus according to claim 10, further comprising a housing containing bed plate and defining said plenum chamber below and a fluidizing chamber above said plate, respectively, the corrugations of the plate extending between opposite longitudinal edges of the plate, each corrugated longitudinal edge portion of the plate being fastened to a correspondingly corrugated flange extending from the inner wall of said housing.

12. An apparatus according to claim 11, wherein said corrugated flange is a first flange of a first angle member fastened to the inner wall of said housing, a second angle member having a second corrugated flange being fastened to said inner wall with said second corrugated flange in engagement with the first corrugated flange.

* * * * *